United States Patent [19]

Lo

[11] Patent Number: 4,607,975

[45] Date of Patent: Aug. 26, 1986

[54] FIXING DEVICE FOR A FISHING ROD

[76] Inventor: Kun N. Lo, No. 33, Hsiang Ho Road, Lie Lin Tzun, Tan Tzu Hsiang, Taichung Hsien, Taiwan

[21] Appl. No.: 697,634

[22] Filed: Feb. 4, 1985

[51] Int. Cl.⁴ ............................................. A01K 87/02
[52] U.S. Cl. ...................... 403/24; 43/18.5; 43/23; 403/104
[58] Field of Search ............... 43/23, 22, 18.1, 18.5; 403/104, 110, 374, 27, 24

[56] References Cited

U.S. PATENT DOCUMENTS

| | | | |
|---|---|---|---|
| Re. 31,013 | 8/1982 | Smith | 403/27 |
| 461,106 | 10/1891 | Oberly | 43/18.1 |
| 1,657,987 | 1/1928 | Albertoni | 403/104 |
| 1,731,173 | 10/1929 | Pope | 43/18.1 |
| 2,456,681 | 12/1948 | Culver | 43/23 |
| 3,762,058 | 10/1973 | Heater | 403/104 |

FOREIGN PATENT DOCUMENTS 544100   6/1956   Italy .......................................... 43/22

Primary Examiner—Gene P. Crosby
Attorney, Agent, or Firm—Barnes & Thornburg

[57] ABSTRACT

A fixing device for a fishing rod is used for joining a inner tube and an outer tube. The inner tube is slidably received within the outer tube and can be fixed onto the outer tube firmly. The fixing device includes a fixing piece or coupling operatively mounted on the outer tube and a packing ring made of flexible material which is urged to grasp the inner tube by the fixing piece.

15 Claims, 4 Drawing Figures

FIXING DEVICE FOR A FISHING ROD

BACKGROUND OF THE INVENTION

The present invention relates to a fixing device, and particularly to a fixing device capable of fixing an inner tube firmly into an outer tube, the inner tube is slidably received within the outer tube.

A fixing device according to this invention is suitable for use in telescopic fishing rods, but it should be appreciated that the invention is not limited in this respect. In general, there are two kinds of fishing rods which have adjustable length. One kind of adjustable fishing rod consists of a set of tubes, each of which can be connected with another to obtain a desired length. Another kind of adjustable fishing rod is a telescopic one. However these known adjustable fishing rods are still not satisfactory to the users. For example, the adjustable length of the former is limited to the length of one tube, so a user cannot adjust the length of the fishing rod at his will, and as for the telesocopic fishing rod, although the length of the fishing rod can be adjusted according to the will of the user, due to a lack of fixing means capable of fixing the piece which was pulled out at any but a predetermined length, the telescopic fixing rod is not stable when it is used, except when pulled out to that predetermined length.

SUMMARY OF THE INVENTION

It is therefore the object of the present invention to provide a fixing device to fix an inner tube into an outer tube which is slidably received said inner tube therein.

In order to attain the above-mentioned object, the fixing device of the present invention comprises a fixing piece used to be engaged with an outer tube in which an inner tube is slidably received, and a packing ring made of flexible material, which is fitted around the inner tube and will be urged and deformed to grasp the inner tube when the fixing piece is enaged with the outer tube tightly so as to prevent the relative movement of the inner tube and the outer tube. In accordance with an aspect of the present invention, the fixing piece is an inner threaded coupling member having knurled outer surface, and the outer tube is provided with an outer threaded portion to engage with the inner threaded coupling member.

The details of the present invention are described in connection with the accompanying drawings wheren:

BRIEF DESCRIPTION OF THE PRESENT INVENTION

PREFERRED EMBODIMENT OF THE PRESENT INVENTION

Figure 1:
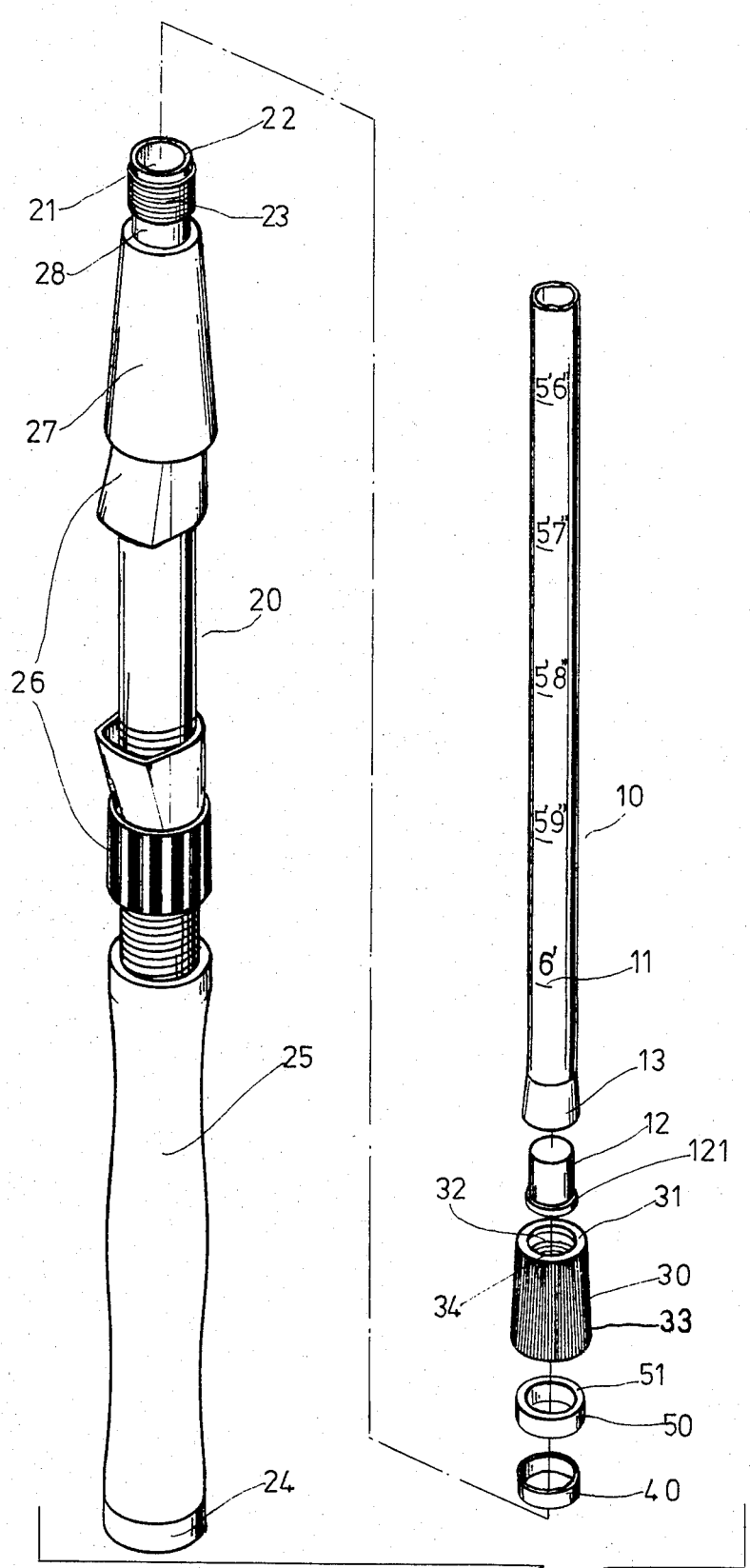
FIG. 1 is an exploded perspective view of a preferred embodiment of the present invention.
Figure 2:
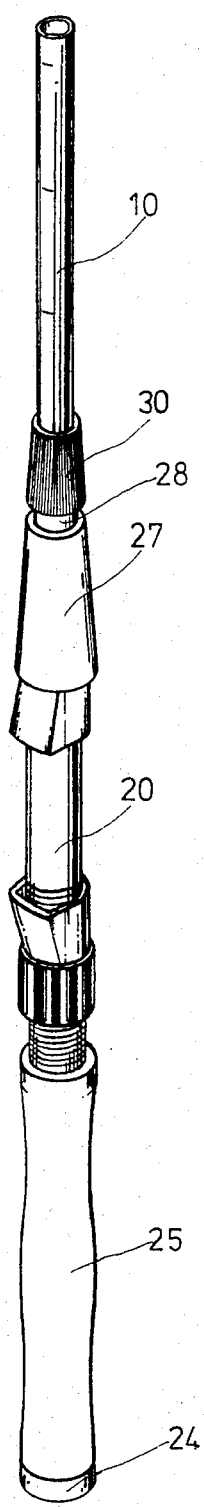
FIG. 2 is a perspective view of the preferred embodiment of FIG. 1.

The present invention will be described in details by referring to the fixing of a telescopic fishing rod. As shown in the FIGS. 1, 2, 3, a telescopic fishing rod using a fixing device of the present invention mainly consists of a fishing rod body 10, a handle portion 20 which is in reality a hollow tube for slidably receiving the fishing rod body 10, a coupling member 30, a packing ring 40, and a protecting ring 50.

The fishing rod body 10 is a long hollow tube which is made of glass fiber or carbon fiber reinforced plastics, and its diameter is gradually smaller toward its tip (not shown in the drawings). The handle portion 20 has a longitudinal hole 21 which is also gradually smaller toward the end surface 22. The handle portion 20 further includes a cap 24 for covering its bottom end, a handle 25 made of cork, a reel fixing means 26, a covering 27, and a bushing 28 having external threaded portion 23. It is noted that at one end of the fishing rod body 10 a expanded portion 13 is formed and a plug 12 having a flange 121 is inserted therein. Therefore when the fishing rod body 10 has been put into the long hole 21 of the handle portion 20 from the bottom end, the fishing rod body 10 will be slide out from the handle portion 20 due to the expanded portion 13 when it is stretched, and the flange 121 will abut against the inner surface of the handle portion 20. The fishing rod body 10 is also provided with scales 11 thereon for the purpose of measuring the length stretched out from the handle portion 20.

The coupling member 30 is made of aluminum alloy and is in a shape of hollow frusto-cone, which includes a abutting surface 31 at its top and an inner thread 34 for engaging with the external thread portion 23 of the bushing 28. The outer surface 33 of the coupling member 30 is knurled to ensure a firm grip. The packing ring 40 is made of rubber. The inner diameter of the packing ring 40 is slightly larger than the outer diameter of the fishing rod body 10. The protecting ring 50 is made of plastics, and is disposed between the coupling member 30 and the packing ring 40.

Figures 3, 3A:
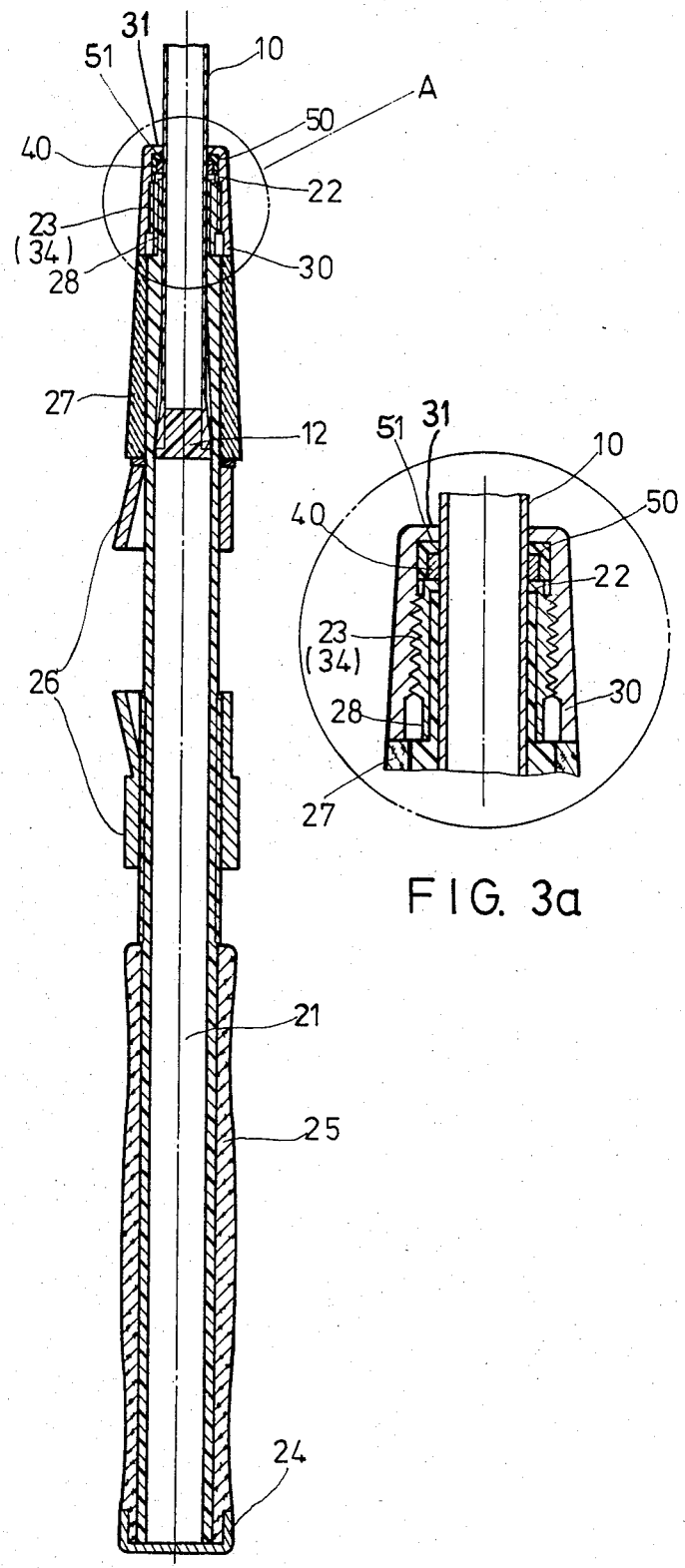
FIG. 3 is a sectional view of the FIG. 2.
FIG. 3a is a enlarged view of the portion A in the FIG. 3.

The fixing mechanism of the fixing device of the present invention will be clearly observed by referring to the FIG. 3a, when the coupling member 30 is screwed down, the abutting surface 31 will urge the protecting ring 50 to compress the packing ring 40, and when the protecting ring 50 is urged to contact with the top of the threaded portion 23, it can no more move downwardly, so the packing ring 40 is compressed and deformed along the radial direction, that will make the packing ring 40 tightly grasp the fishing rod body 10, therefore prevent the movement relative to the handle portion 12.

What is claimed is:

1. A fixing device comprising:
 a fixing piece adapted to be engaged onto an outer tube means in which an inner tube is slidably received;
 a packing ring made of flexible material and fitted around said inner tube; and
 a protecting ring disposed between said fixing piece and said packing ring, the protecting ring including a top wall and a side wall depending from an edge of the top wall, the top and side walls cooperating to define a chamber for receiving the packing ring, the packing ring being urged and deformed by the protecting ring in both axial and radial directions to grasp said inner tube when said fixing piece is engaged onto said outer tube means tightly so as to prevent the relative movement of said inner tube and said outer tube means.

2. A fixing device as claimed in claim 1, wherein said fixing piece is an inner threaded coupling member and said outer tube means is provided with a outer threaded portion to engage with said inner threaded coupling member.

3. A fixing device as claimed in claim 1, wherein said packing ring is made of rubber.

4. A fixing device as claimed in claim 1, wherein said inner tube is a fishing rod body, and said outer tube means includes a handle.

5. A fixing device as claimed in claim 2, wherein said coupling member is provided with a knurled outer surface.

6. An apparatus for fixing an outer tube means having an end surface to an inner tube telescopically received in the outer tube means, the apparatus comprising
   a resilient packing ring disposed about the inner tube,
   a coupling member connected to the outer tube means for movement between a release position and a gripping position, and
   a protecting ring disposed between the packing ring and the coupling member, the protecting ring including means for urging the resilient packing ring against the end surface of the outer tube means in response to movement of the coupling member toward its gripping position to compress the resilient packing ring in an axial direction relative to the inner tube and outer tube means causing the resilient packing ring to expand in a radial direction relative to the inner tube and outer tube means and said protecting ring further including means for limiting radially outward expansion of the resilient packing ring during axial compression of the resilient packing ring to enhance hydraulic compression of the packing ring on the inner tube so that the inner tube and outer tube means are fixed tightly to one another.

7. The apparatus of claim 6, wherein the urging means is defined by a top wall having an outer edge and a central aperture for slidably receiving the inner tube, and the limiting means is defined by a side wall depending from the outer edge of the top wall.

8. The apparatus of claim 7, wherein the end surface of the outer tube means, and the top and side walls of the protecting ring cooperate to define a shrinkable chamber for receiving the resilient packing ring therein, the chamber shrinking in volume to deform the resilient packing ring and hold the resilient packing ring in both axial and radial compression against the inner tube in response to movement of the coupling member toward its gripping position.

9. The apparatus of claim 6, wherein the coupling member includes an interior threaded portion and the outer tube means includes an exterior threaded portion for engaging the interior threaded portion of the coupling member.

10. The apparatus of claim 9, wherein the limiting means includes a continuous skirt interposed between the resilient packing ring and an interior portion of the coupling member to prevent ring-damaging contact therebetween during movement of the coupling member.

11. The apparatus of claim 6, wherein the resilient packing ring is made of rubber.

12. The apparatus of claim 6, wherein the inner tube is a fishing rod body and the outer tube means includes a handle.

13. An apparatus for fixing an outer tube means having an end surface to an inner tube telescopically received in the outer tube means the apparatus comprising
   a resilient packing ring disposed about the inner tube, the resilient packing ring having a top surface, a bottom surface, and a peripheral side wall extending therebetween,
   a coupling member connected to the outer tube means for movement between a release position and a gripping position, and
   a protecting ring disposed between the top surface of the packing ring and the coupling member, the protecting ring including skirt means for continuously embracing the peripheral side wall of the packing ring during movement of the coupling member toward its gripping position to limit radially outward expansion of the resilient packing ring so that the resilient packing ring is compressed and deformed in a radial direction relative to the inner tube and outer tube means to fix the inner tube and outer tube means tightly to one another and substantially prevent relative movement therebetween.

14. The apparatus of claim 13, wherein the protecting ring further includes means for urging the bottom surface of the resilient packing ring against the end surface of the outer tube means in response to movement of the coupling member toward its gripping position.

15. The apparatus of claim 14, wherein the urging means is defined by a top wall having an outer edge and a central aperture for slidably receiving the inner tube and the skirt means for embracing is defined by a side wall depending from the outer edge of the top wall.

* * * * *

UNITED STATES PATENT AND TRADEMARK OFFICE
CERTIFICATE OF CORRECTION

PATENT NO. : 4,607,975
DATED : August 26, 1986
INVENTOR(S) : Lo

It is certified that error appears in the above-identified patent and that said Letters Patent is hereby corrected as shown below:

In Col. 1, line 25 delete "fixing" and insert --fishing--.

In Col. 1, line 48 delete "wheren" and insert --wherein--.

In Col. 2, line 17 delete "be" and insert --not--.

Signed and Sealed this

Twentieth Day of January, 1987

Attest:

DONALD J. QUIGG

Attesting Officer   Commissioner of Patents and Trademarks